(12) United States Patent
Nahm et al.

(10) Patent No.: US 7,311,351 B1
(45) Date of Patent: Dec. 25, 2007

(54) VEHICLE SPOILER HAVING NOZZLE AND METHOD OF MANUFACTURING THE SAME

(75) Inventors: Alexander Hong Nahm, Gyeongsangbuk-do (KR); O Yeol Kwon, Daegu-si (KR)

(73) Assignee: Moya International Co., Ltd., Gyeongsangbuk-Do (KR)

( * ) Notice: Subject to any disclaimer, the term of this patent is extended or adjusted under 35 U.S.C. 154(b) by 0 days.

(21) Appl. No.: 11/461,968

(22) Filed: Aug. 2, 2006

(51) Int. Cl.
*B62D 37/02* (2006.01)
*B60S 1/58* (2006.01)
*B60S 1/52* (2006.01)

(52) U.S. Cl. .................................................. 296/180.1
(58) Field of Classification Search ............. 296/180.1; 180/903
See application file for complete search history.

(56) References Cited

U.S. PATENT DOCUMENTS

| 5,060,340 | A | * | 10/1991 | Grassini | .................. | 15/250.24 |
| 5,356,195 | A | * | 10/1994 | Kanda | ...................... | 296/180.1 |
| 5,415,453 | A | * | 5/1995 | Huber | ...................... | 296/180.1 |
| 6,836,924 | B2 | * | 1/2005 | Egan-Walter | ............. | 15/250.04 |
| 7,252,324 | B1 | * | 8/2007 | Nahm et al. | ............. | 296/180.1 |
| 2007/0069549 | A1 | * | 3/2007 | Nahm et al. | ............. | 296/180.1 |

FOREIGN PATENT DOCUMENTS

| DE | 3206173 A1 | * | 8/1983 | ................. | 219/203 |
| DE | 19914122 A1 | * | 9/2000 | .............. | 296/180.1 |
| DE | 10124508 A1 | * | 11/2002 | .............. | 296/180.1 |
| FR | 2666776 A1 | * | 3/1992 | .............. | 15/250.04 |
| JP | 60038236 A | * | 2/1985 | .............. | 296/180.1 |
| JP | 60092992 A | * | 5/1985 | .............. | 296/180.1 |
| JP | 60259578 A | * | 12/1985 | .............. | 296/180.1 |
| JP | 61220977 A | * | 10/1986 | .............. | 296/180.1 |
| JP | 02200581 A | * | 8/1990 | .............. | 296/180.1 |
| JP | 03143778 A | * | 6/1991 | .............. | 296/180.1 |
| JP | 04260874 A | * | 9/1992 | .............. | 296/180.1 |
| JP | 11189180 A | * | 7/1999 | .............. | 296/180.1 |
| JP | 2005329772 A | * | 12/2005 | .............. | 296/180.1 |

* cited by examiner

*Primary Examiner*—Dennis H. Pedder
*Assistant Examiner*—Paul Chenevert
(74) *Attorney, Agent, or Firm*—Volpe and Koenig PC (57) ABSTRACT

The present invention provides a vehicle spoiler having a nozzle and a method of manufacturing the vehicle spoiler. The vehicle spoiler of the present invention has first and second surfaces, which form the external shape of the vehicle spoiler and have a hollow space therebetween. The vehicle spoiler includes a support unit, which is provided on the second surface and has a nozzle installation space therein, and a holding part, which is formed in a shape that surrounds the support unit so as to fasten the support unit to the second surface. The vehicle spoiler further includes a through hole, which is formed by cutting part of the holding part and part of the support unit such that the nozzle installation space communicates with the hollow space through the through hole, and a discharge unit, which is installed in the support unit through the through hole and has a nozzle for spraying window washer fluid.

6 Claims, 11 Drawing Sheets

Fig. 1

( prior art )

VEHICLE SPOILER HAVING NOZZLE AND METHOD OF MANUFACTURING THE SAME

BACKGROUND OF THE INVENTION

1. Field of the Invention

The present invention relates generally to vehicle spoilers having nozzles and methods of manufacturing the vehicle spoilers and, more particularly, to a vehicle spoiler having a nozzle and a method of manufacturing the vehicle spoiler, in which a support plate for mounting the nozzle is integrated with the vehicle spoiler during a process of injection-molding the vehicle spoiler, thus enhancing the productivity thereof.

2. Description of the Related Art

Generally, various kinds of spoilers have been used depending on the kind of vehicle. Such a spoiler prevents the vehicle body from being lifted by air current when the vehicle moves at high speeds, and the spoiler increases traction between wheels and the ground, thus preventing energy loss in the transfer of the engine power, and enhancing steerability and brakeability, thereby ensuring the stability of the vehicle when moving at high speeds.

The spoiler does not require high mechanical stiffness, and the shape thereof is regarded as most important.

Therefore, the spoilers have been manufactured by various forming methods that pursue lightness and reduction of the amount of material used.

Among the above manufacturing methods, a blow-molding method has been most widely used. In the blow-molding method, a parison is preformed by extruding or injection-molding a thermoplastic substance into a tube shape. After the parison is placed in a mold, hot air is blown into the parison to inflate the parison into the shape defined by the mold. Subsequently, the parison is solidified by cooling, thus the product having a hollow structure is completed.

The blow-molding method has been widely used for manufacturing spoilers, because the cost of production is relatively low and stress in the formed product is reduced.

Hereinafter, a conventional spoiler for vehicles will be explained with reference to FIG. 1.

Figure 1:
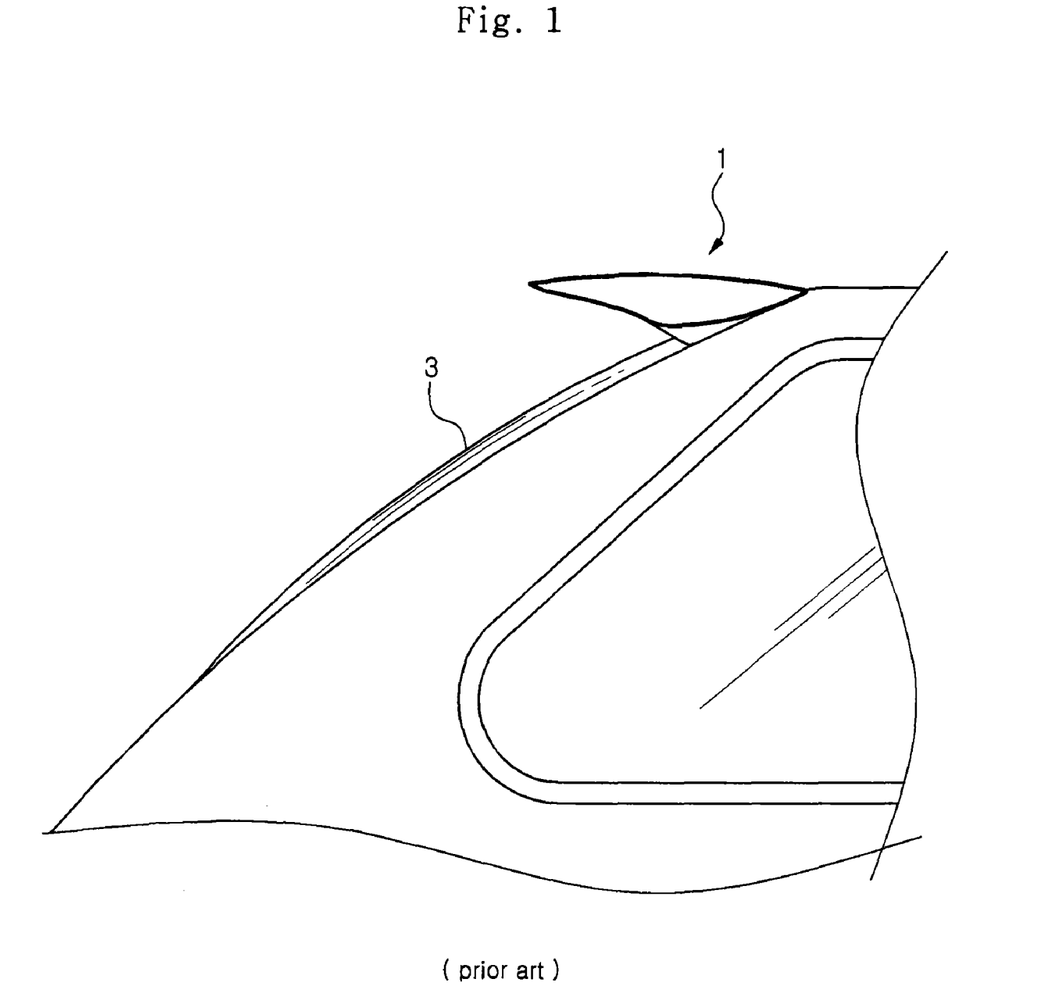
FIG. 1 is a view showing a conventional spoiler mounted to a vehicle.

As shown in FIG. 1, the conventional spoiler 1 for vehicles has a blade shape having a streamlined cross-section and is mounted at a rear position to the trunk of a vehicle or, in the case of a sport utility vehicle, is mounted along the edge of the vehicle body above a rear windshield 3.

The spoiler 1 comprises an upper surface and a lower surface and is hollow so as to reduce the weight thereof.

In the case where the spoiler 1 having the above-mentioned construction is mounted to the corner of the vehicle body above the rear windshield 3, because the position at which the spoiler 1 is mounted is similar to that of a nozzle for spraying window washer fluid onto the rear windshield 3, the spoiler 1 and the nozzle may interfere with each other.

To avoid the above problem, the spoiler 1 is manufactured such that the nozzle is integrated with the spoiler 1. However, in this case, there is a problem in that it is difficult to form a support unit for mounting the nozzle because the spoiler 1 is manufactured by blow-molding.

That is, to mount the nozzle to the spoiler 1, a hole corresponding to the outer diameter of the nozzle must be formed in the spoiler 1, but it is very difficult to form a hole having precise dimensions in the spoiler 1 using the blow-molding process. Therefore, a solution to this has been required.

SUMMARY OF THE INVENTION

Accordingly, the present invention has been made keeping in mind the above problems occurring in the prior art, and an object of the present invention is to provide a vehicle spoiler having a nozzle and a method of manufacturing the vehicle spoiler, in which a support plate for mounting the nozzle is integrated with the vehicle spoiler during a process of blow-molding the vehicle spoiler, thus enhancing the productivity thereof.

In an aspect, the present invention provides a vehicle spoiler having first and second surfaces forming an external shape of the vehicle spoiler, with a hollow space defined in the vehicle spoiler. The vehicle spoiler includes: a support unit provided on the second surface, with a nozzle installation space defined in the support unit; a holding part formed in a shape surrounding the support unit to fasten the support unit to the second surface; a through hole formed by cutting part of the holding part and part of the support unit such that the nozzle installation space communicates with the hollow space through the through hole; and a discharge unit installed in the support unit through the through hole and having a nozzle for spraying window washer fluid.

Preferably, the support unit may include: a mounting member having a fastening plate for mounting the nozzle; and a cover member fitted over an upper end of the mounting member, thus forming the nozzle installation space therein.

Furthermore, a stop protrusion may be provided on a sidewall of the mounting member so that the cover member is stopped by and fastened to the stop protrusion.

As well, the support unit may be integrated with the second surface in a process of blow-molding the vehicle spoiler.

In another aspect, the present invention provides a method of manufacturing a vehicle spoiler using upper and lower molds defining a cavity therebetween, including: placing a support unit on the lower mold; inserting a parison into the cavity after the support unit is placed; forming the parison into a shape of the cavity by supplying hot air to the parison; forming a holding part from part of the parison surrounding the support unit while the parison is formed into the shape of the cavity; forming a through hole by cutting parts of the support unit and the holding part using a machining tool after the holding part is formed; and installing a nozzle in the support unit through the through hole.

Preferably, a support protrusion for holding the support unit may be provided on the lower mold.

In the present invention having the above-mentioned construction, because the support unit for mounting the nozzle is integrally provided in the vehicle spoiler during a process of blow-molding the vehicle spoiler, neither a separate assembly process nor a separate coupling member is required.

Therefore, the time required to assemble the vehicle spoiler is reduced, thus productivity is increased.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, a vehicle spoiler having a nozzle and a method of manufacturing the spoiler according to embodiments of the present invention will be described in detail with reference to the attached drawings. In the drawings, the thicknesses of lines or the sizes of elements may be exaggerated to more clearly and conveniently illustrate the present invention. Furthermore, the terms used will be defined in consideration of their functions in the present invention, and thus the definition of these terms may be changed depending on the intention or practice of a user or operator. Therefore, the definitions of the terms must be determined based on the entire content of the specification.

Figure 2:
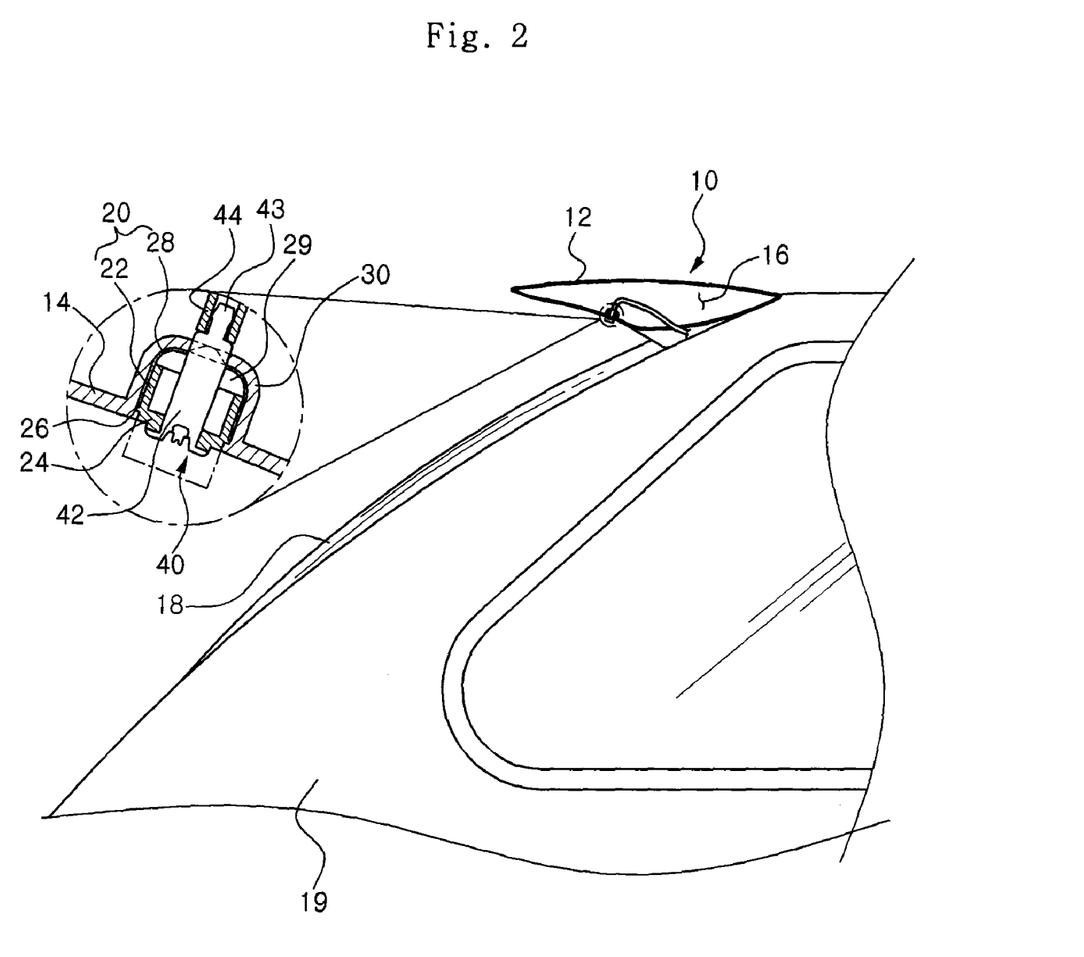
FIG. 2 is a view showing an installed vehicle spoiler having a nozzle, according to a first embodiment of the present invention.
Figure 3:
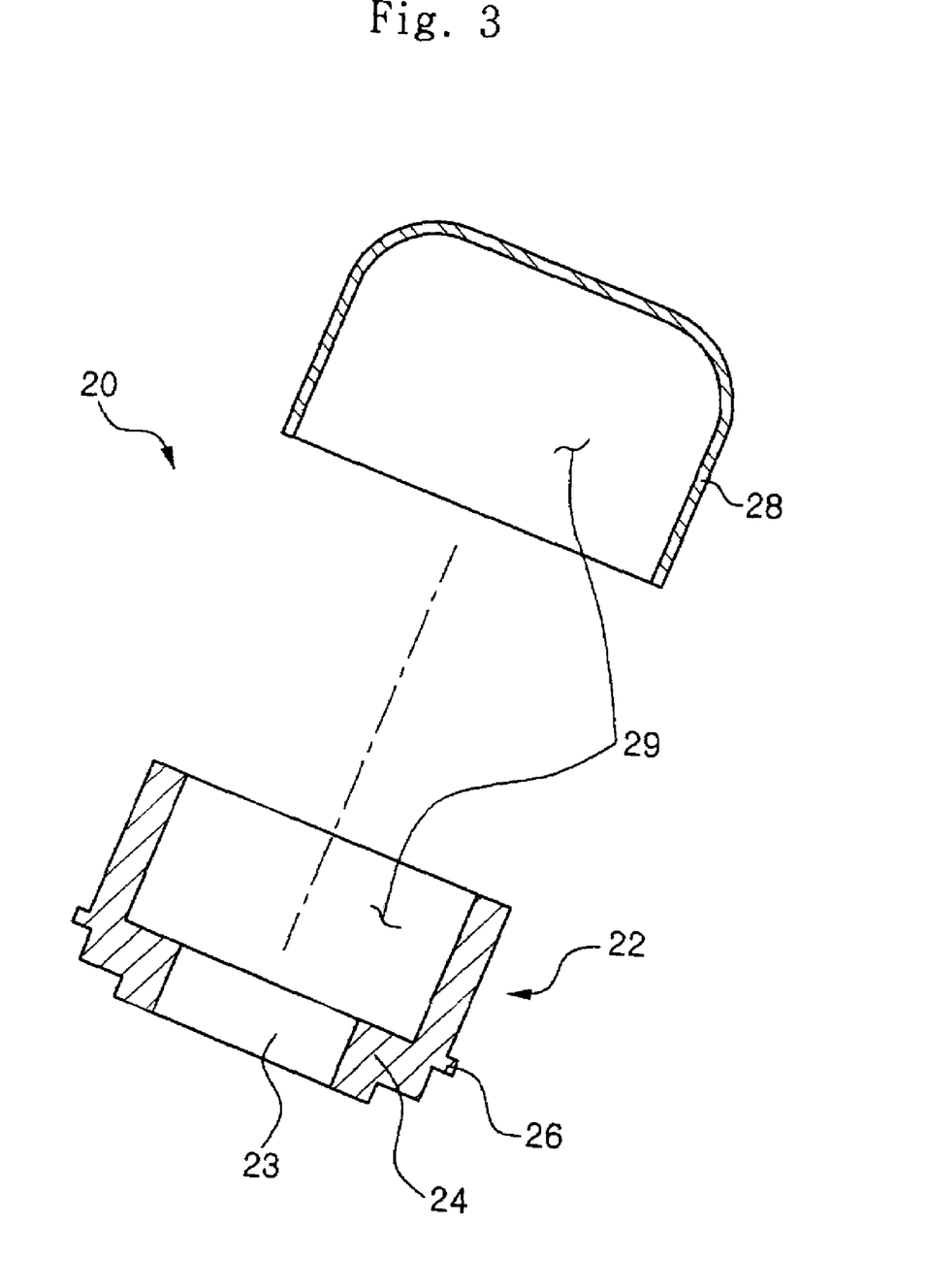
FIG. 3 is an exploded view showing a support unit of the vehicle spoiler of FIG. 2.
Figure 4:
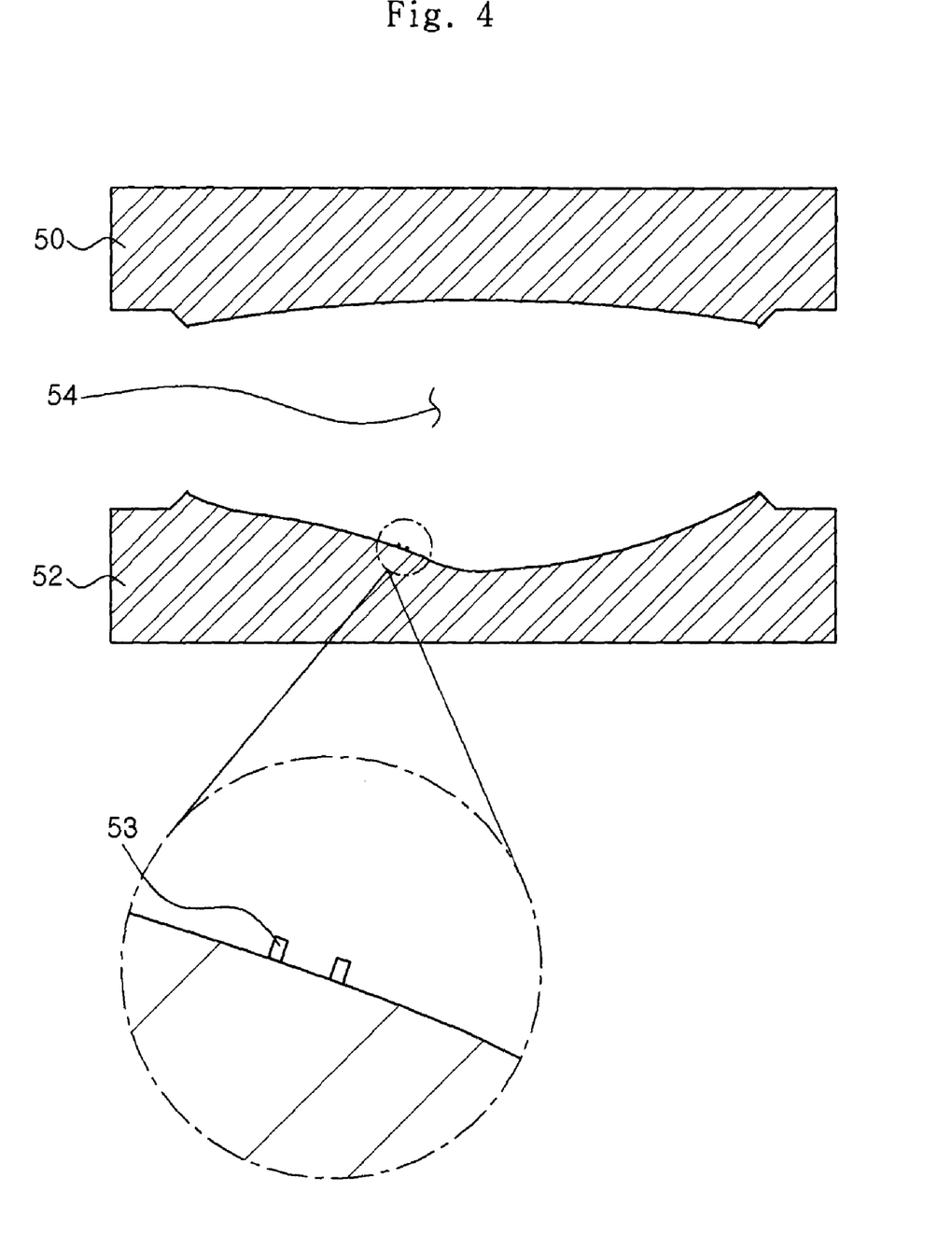
FIG. 4 is a view showing a mold used for manufacturing the vehicle spoiler having the nozzle according to the first embodiment of the present invention.
Figure 5:
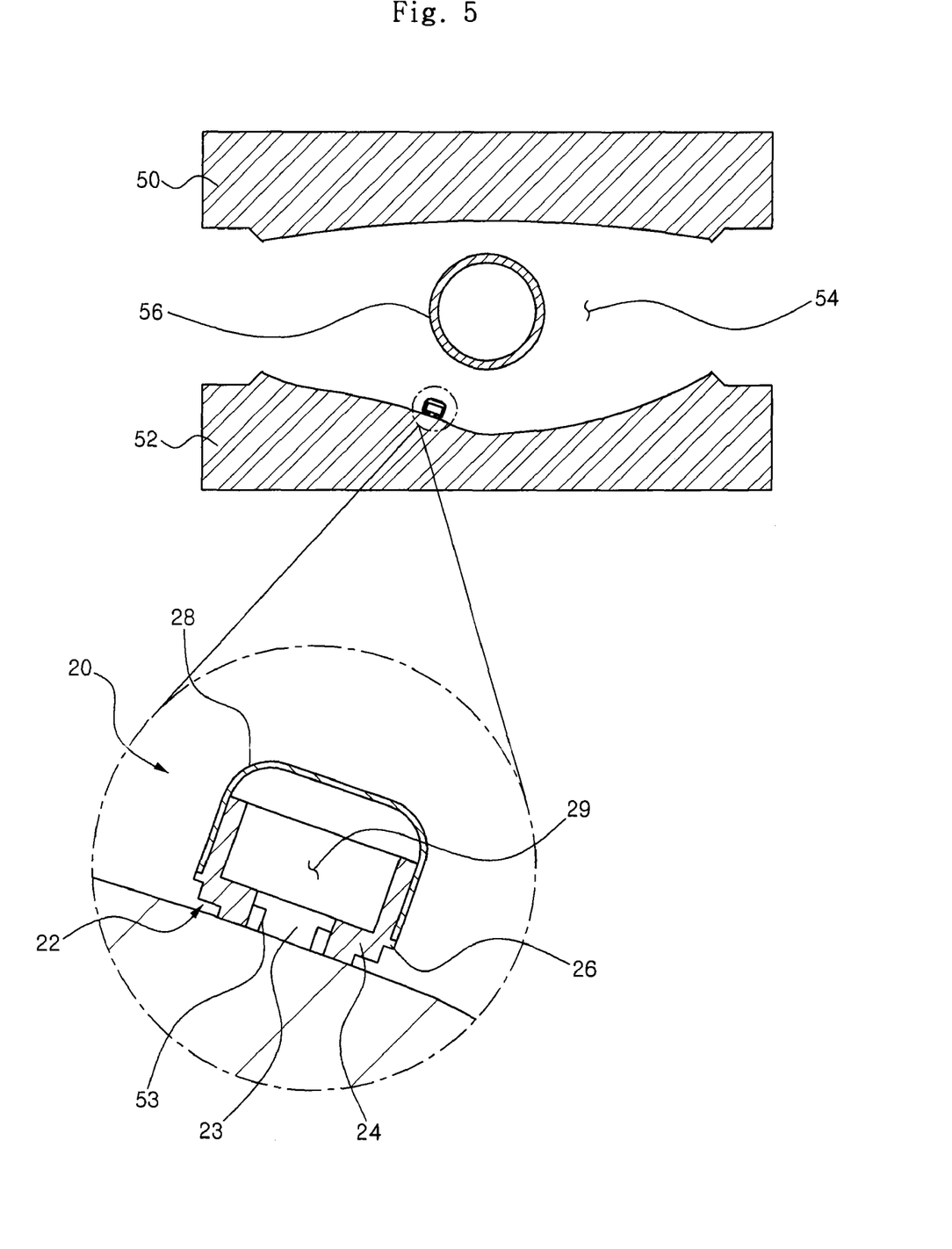
FIG. 5 is a view showing a parison inserted into the mold of FIG. 4.
Figure 6:
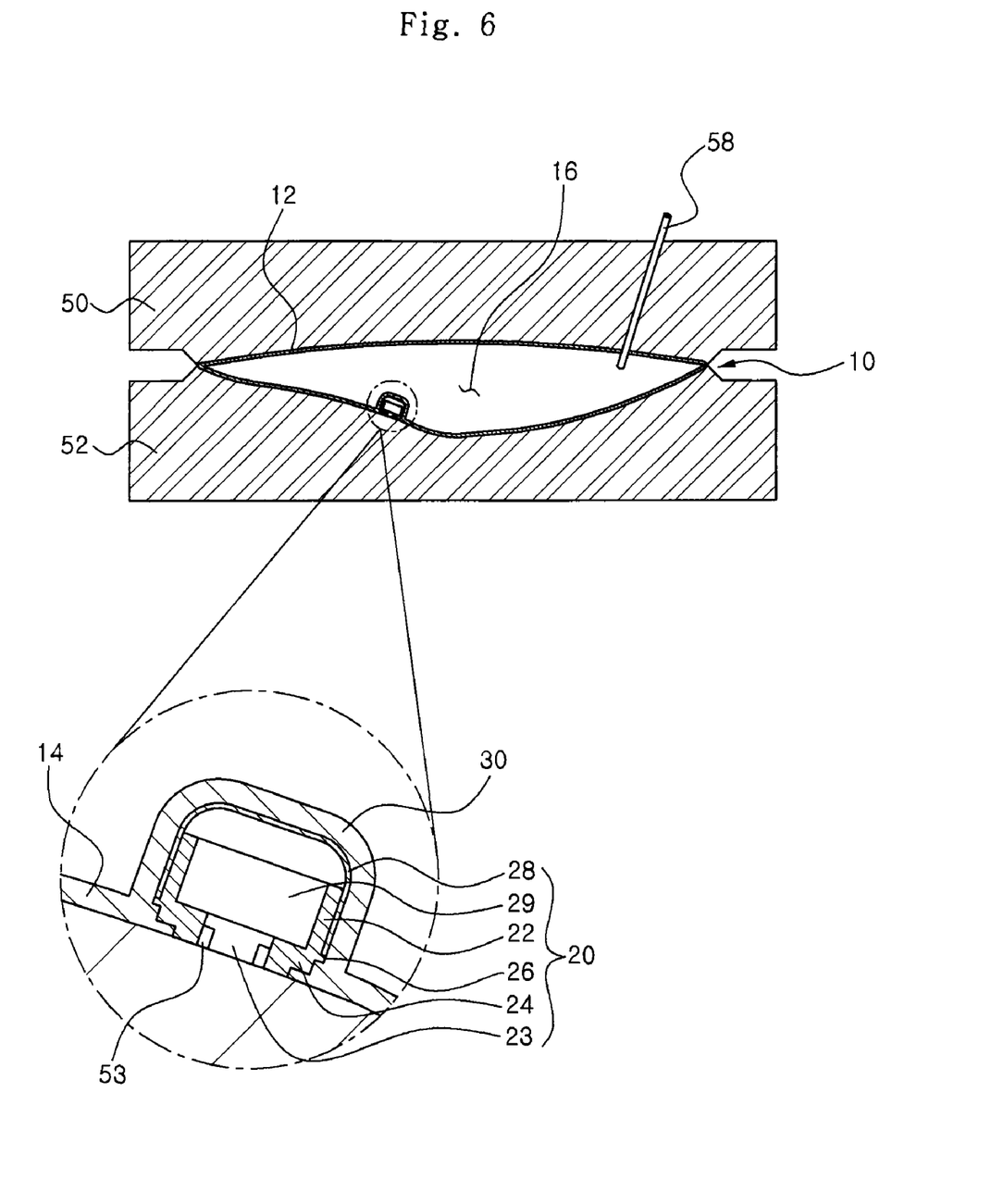
FIG. 6 is a view showing the vehicle spoiler formed in a shape such that the support unit is surrounded by the vehicle spoiler, by supplying hot air to the parison of FIG. 5.
Figure 7:
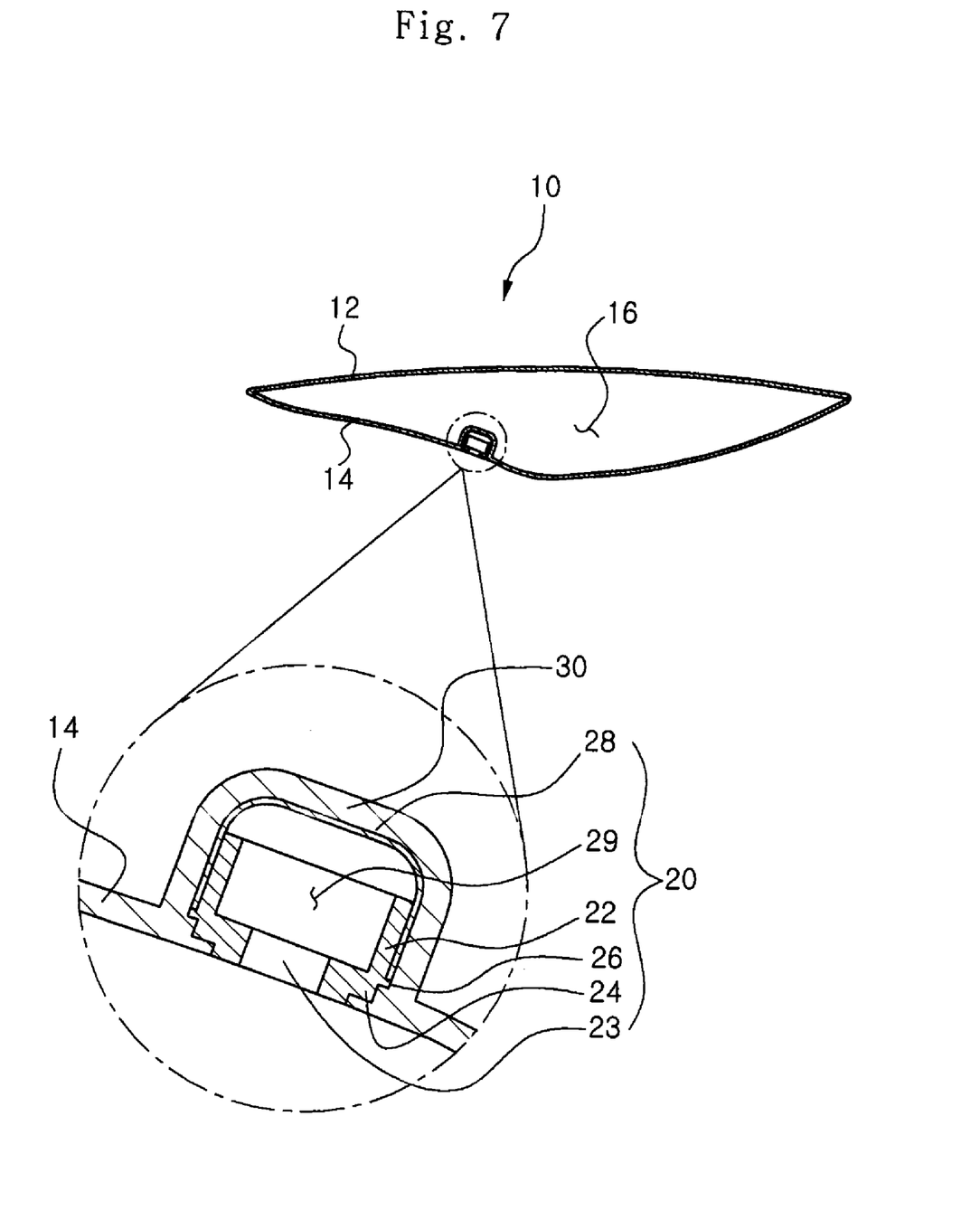
FIG. 7 is a view showing the vehicle spoiler blow-molded using the mold of FIG. 6.
Figure 8:
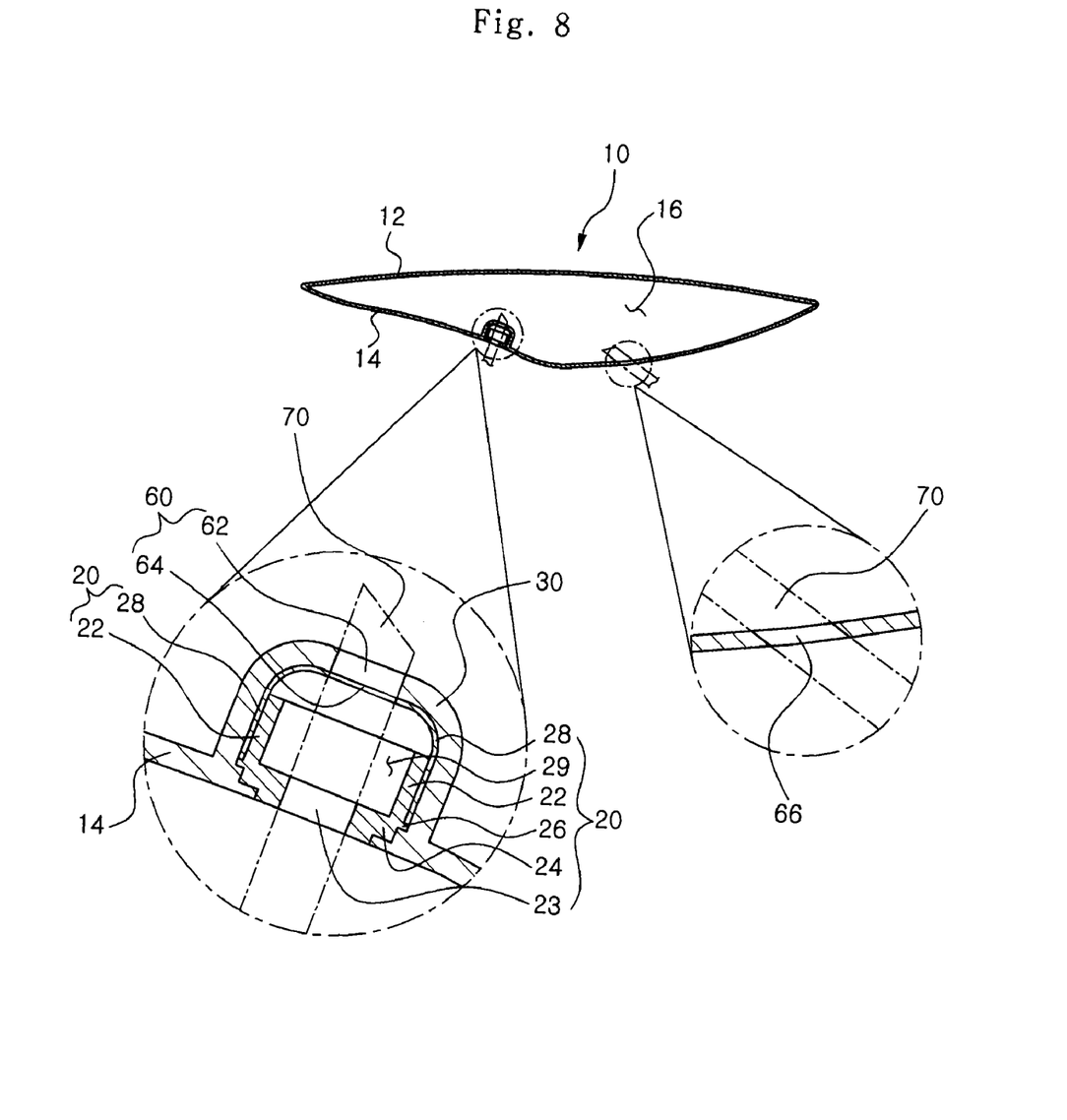
FIG. 8 is a view illustrating a process of machining the vehicle spoiler of FIG. 7 using a machining tool.
Figure 9:
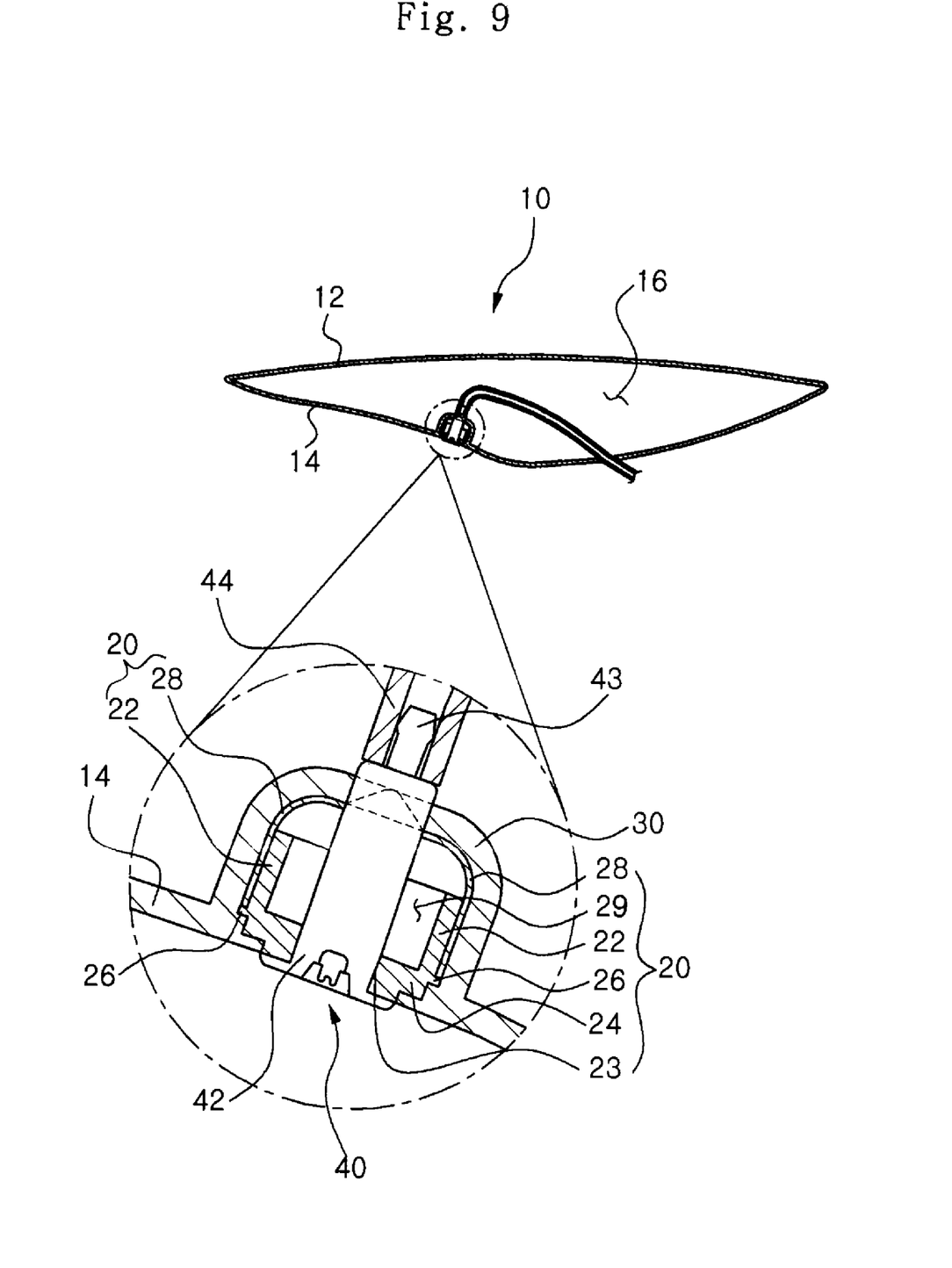
FIG. 9 is a view showing a discharge unit, which has the nozzle and is mounted to the support unit of FIG. 8.

FIG. 2 is a view showing an installed vehicle spoiler 10 having a nozzle 42, according to a first embodiment of the present invention. FIG. 3 is an exploded view showing a support unit 20 of the vehicle spoiler 10 of FIG. 2. FIG. 4 is a view showing a mold used for manufacturing the vehicle spoiler 10 having the nozzle 42 according to the first embodiment of the present invention. FIG. 5 is a view showing a parison 56 inserted into the mold of FIG. 4. FIG. 6 is a view showing the vehicle spoiler 10 formed in a shape such that the support unit 20 is surrounded by the vehicle spoiler 10, by supplying hot air to the parison 56 of FIG. 5. FIG. 7 is a view showing the vehicle spoiler 10 blow-molded using the mold of FIG. 6. FIG. 8 is a view illustrating a process of machining the vehicle spoiler 10 of FIG. 7 using a machining tool 70. FIG. 9 is a view showing a discharge unit 40, which has the nozzle 42 and is mounted to the support unit 20 of FIG. 8.

As shown in FIG. 2, a rear windshield 18 is provided at a rear position in a vehicle body 19, and the vehicle spoiler 10 is provided above the rear windshield 18.

The vehicle spoiler 10 includes a first surface 12 and a second surface 14, and a hollow space 16 is defined in the vehicle spoiler 10.

In the first embodiment of the present invention, the first surface 12 is defined as the upper surface of the vehicle spoiler 10 (as seen in FIG. 2), and the second surface 14 is defined as the lower surface of the vehicle spoiler 10. However, the case where the first surface is defined as the lower surface of the vehicle spoiler 10 and the second surface is defined as the upper surface of the vehicle spoiler 10 is also regarded as being within the scope of the present invention.

The support unit 20 includes a mounting member 22 and a cover member 28 and is integrally provided on the second surface 14.

The support unit 20 may be integrally provided on the vehicle spoiler 10 through an injection molding process or another forming process. In the first embodiment of the present invention, the support unit 20 is integrally provided on the second surface 14 of the vehicle spoiler 10 through a blow-molding process.

In detail, as shown in FIG. 3, the support unit 20 includes the mounting member 22, which is provided with a fastening plate 24 for mounting the nozzle 42, and the cover member 28, which is fitted over an upper end of the mounting member 22 and defines a nozzle installation space 29 of the nozzle 42 therein.

Furthermore, a stop protrusion 26 is provided on a sidewall of the mounting member 22, such that the cover member 28 is stopped by the stop protrusion 26 when it is coupled to the mounting member 22.

A connection hole 23 is formed in a lower end of the mounting member 22 and serves as a passage through which window washer fluid is sprayed from the nozzle 42 onto the rear windshield 18.

As shown in FIG. 2, the upper part of the stop protrusion 26 stops the cover member 28, and the lower part of the stop protrusion 26 is stopped by the second surface 14 of the vehicle spoiler 10.

When a blow-molding process is conducted after the support unit 20 has been placed in the mold, the vehicle spoiler 10 is formed into a shape in which part of the second surface 14 surrounds the support unit 20. Thereby, a holding part 30, which fastens the support unit 20 to the second surface 14, is formed.

As shown in FIG. 8, a through hole 60 for coupling the nozzle 42 to the support 20 is formed in the cover member 28 and the holding part 30 by the machining tool 70.

The through hole 60 includes an upper through hole 62, which is formed in the holding part 30 by cutting, and a lower through hole 64, which is formed in the cover member 28 by cutting.

The nozzle installation space 29 communicates with the hollow space 16 through the through hole 60. The discharge unit 40 is mounted to the support unit 20 through the through hole 60.

As shown in FIG. 2, the discharge unit 40 includes the nozzle 42 for spraying window washer fluid.

A lower end (when viewed in FIG. 2) of the nozzle 42 is the part through which window washer fluid is sprayed. A connection nipple 43 is provided on an upper end of the nozzle 42, and a supply tube 44 for supplying window washer fluid is connected to the connection nipple 43.

Hereinafter, a method of manufacturing the vehicle spoiler of the present invention having the above-mentioned construction will be described.

As shown in FIG. 4, a cavity 54 for forming the spoiler 10 is defined by molding surfaces, which are provided on inner surfaces of an upper mold 50 and a lower mold 52.

A support protrusion 53 for holding the support unit 20 is provided on the lower mold 52.

Thereafter, as shown in FIG. 5, the step of mounting the support unit 20 to the lower mold 52 is conducted.

Here, the support protrusion 53 is inserted into the connection hole 23 of the support unit 20, so that the support unit 20 is prevented from undesirably moving.

After the support unit 20 has been installed, the step of inserting the parison 56 into the cavity 54 is conducted.

As shown in FIG. 6, the upper mold 50 is placed onto the lower mold 52 such that the cavity 54 is tightly closed. Subsequently, the step of forming the parison 56 into the shape of the cavity 54 by supplying hot air to the parison 56 through a supply pipe 58 is conducted.

While the parison 56 is formed to have the shape defined by the cavity 54, because the second surface 14 of the vehicle spoiler 10 can flow due to the hot air, the step of forming the holding part 30 having a shape serving to surround the support unit 20 is conducted.

Furthermore, the stop protrusion 26 of the support unit 20 is stopped at the lower surface thereof by, and is fastened to, the second surface 14.

Thereafter, as shown in FIG. 7, the spoiler 10 is removed from the mold. As shown in FIG. 8, the step of forming the through hole 60 by cutting parts of the support unit 20 and the holding part 30 using the machining tool 70 is conducted.

Here, the machining tool 70 is inserted into the support unit 20 through the lower end (when viewed in FIG. 8) of the support unit 20 and forms the lower through hole 64 and the upper through hole 62.

Thereafter, to form a passage for the supply tube 44, to be coupled to the nozzle 42, a tube passing hole 66 is formed through the second surface 14 at a position spaced apart from the support 20 by a predetermined distance using the machining tool 70.

As shown in FIG. 9, the step of installing the nozzle in the support unit 20 through the through hole 60 is conducted.

The nozzle 42 is stopped by and coupled to the fastening plate 24 using locking screws. The supply tube 44 is coupled to the connection nipple 43, which extends from the nozzle 42. Once the supply tube 44 is coupled to the nozzle 42, the free end of the supply tube 44 is placed through the through hole 60, a wire is employed through the tube passing hole 66 to grasp the free end of the supply tube 44 within the hollow space 16 of the spoiler 10, and then the free end of the supply tube 44 is pulled with the wire through the tube passing hole 66.

The supply tube 44 extends outside through the tube passing hole 66 and is connected to a window washer fluid supply device.

Hereinafter, a vehicle spoiler having a nozzle according to a second embodiment of the present invention and the method of manufacturing the vehicle spoiler will be described with reference to the attached drawings.

Figure 10:
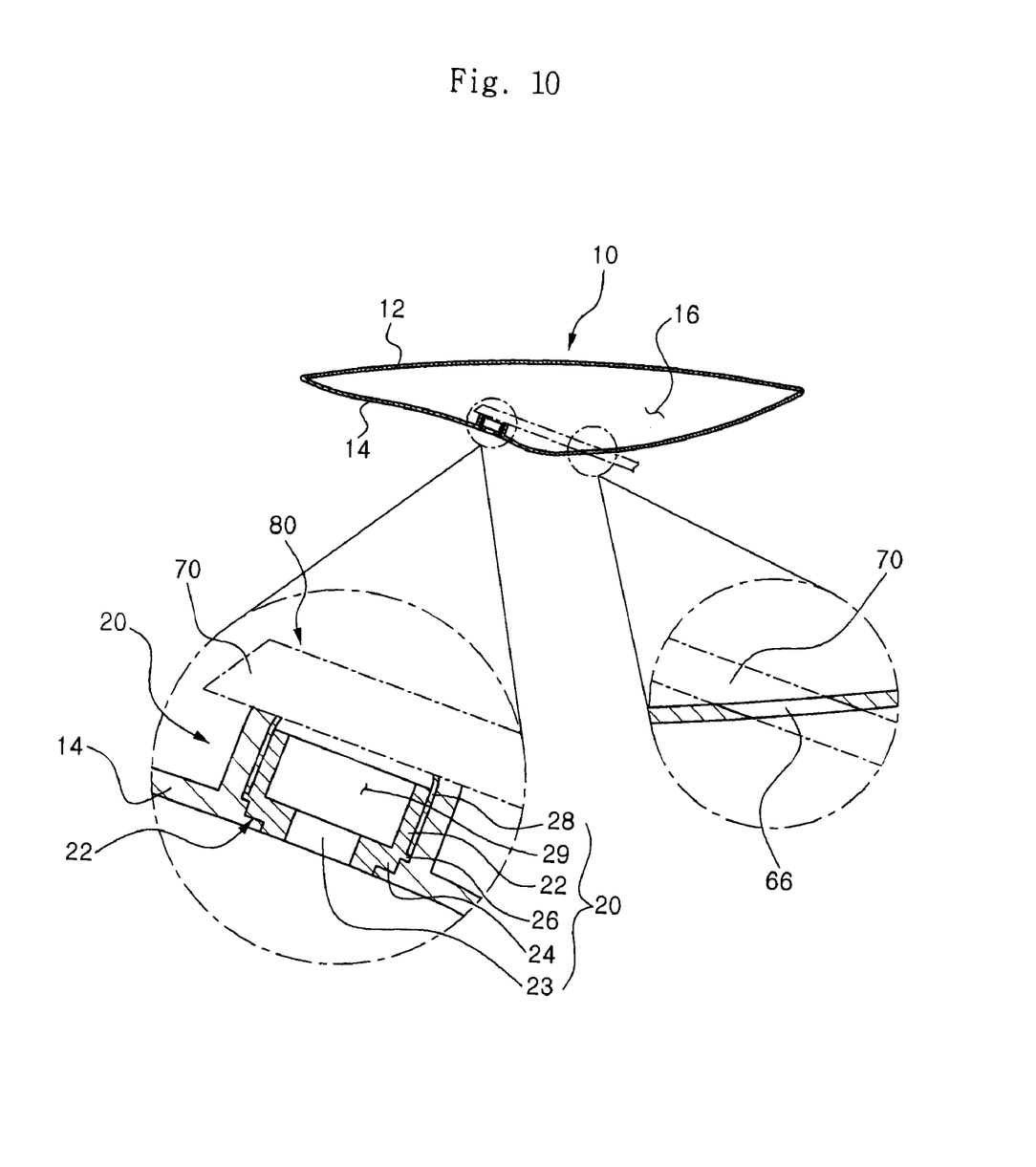
FIG. 10 is a view showing a vehicle spoiler having a nozzle according to a second embodiment of the present invention, illustrating a process of machining the vehicle spoiler using a machining tool.
Figure 11:
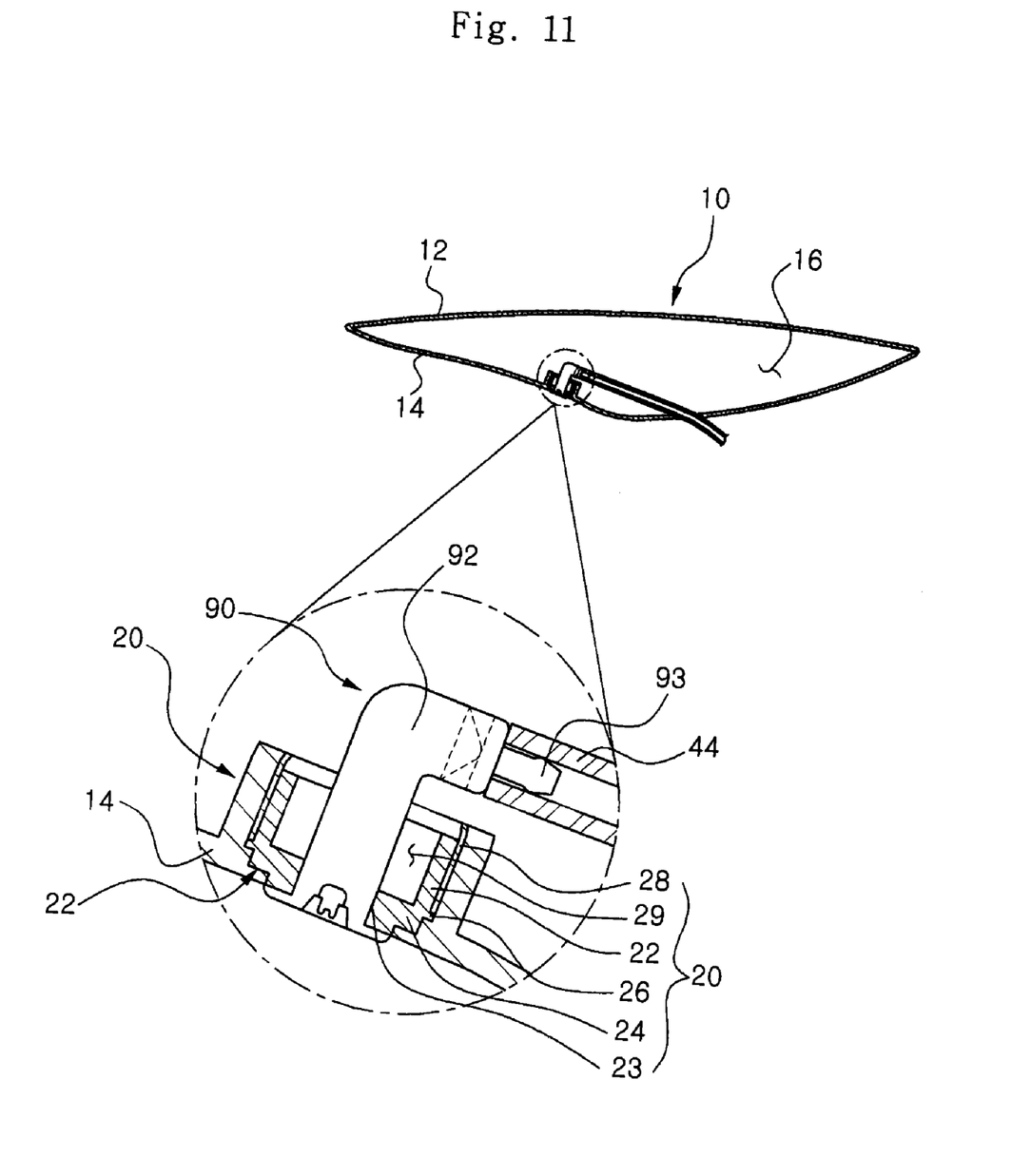
FIG. 11 is a view showing installation of a discharge unit having the nozzle in the support unit of the vehicle spoiler of FIG. 10.

FIG. 10 is a view showing a vehicle spoiler 10 having a through hole 80 according to a second embodiment of the present invention, illustrating a process of machining the vehicle spoiler using a machining tool 70. FIG. 11 is a view showing the installation of a discharge unit having a nozzle 92 in the support unit 20 of the vehicle spoiler 10 of FIG. 10.

For convenience of description, components having the same operation and effect as those of the first embodiment will be designated by the same reference numerals as in the first embodiment, and detailed explanations thereof will be omitted.

As shown in FIG. 10, in a process of forming a tube passing hole 66, which serves as a passage for a supply tube 44, and forming a through hole 80 for installation of the nozzle 92, ends of a support unit 20 and a holding part 30 are cut by the machining tool 70 inserted through the tube passing hole 66.

Then, the tube passing hole 66 and the through hole 80 can be formed through a single machining process using the machining tool 70, unlike the first embodiment, in which two machining processes are conducted.

A straight nozzle 42 may be mounted to the support unit 20. Alternatively, as shown in FIG. 11, a nozzle 92 which is bent at an intermediate portion thereof may be mounted to the support unit 20, thus forming the discharge unit 90.

The supply tube 44 is coupled to a connection nipple 93 of the nozzle 92, and extends outside through the tube passing hole 66.

According to the above-mentioned construction of the vehicle spoiler 10 of the present invention, a straight nozzle 42 or a bent nozzle 92 can be selectively used, that is, intercompatibility is ensured.

Furthermore, when the vehicle spoiler 10 is formed through the blow-molding process, the support unit 20 for mounting the nozzle 42 or 92 is readily coupled to the vehicle spoiler 10 without using a separate coupling member. Therefore, the manufacturing process is simplified.

Although the preferred embodiments of the present invention have been disclosed for illustrative purposes with reference with the attached drawings, those skilled in the art will appreciate that various modifications, additions and substitutions are possible, without departing from the scope and spirit of the invention as disclosed in the accompanying claims.

Therefore, the technical scope of the present invention must be defined by the accompanying claims.

As described above, in a vehicle spoiler having a nozzle and the method of manufacturing the vehicle spoiler according to the present invention, a support unit for mounting a nozzle can be coupled to the vehicle spoiler during a process of blow-molding the vehicle spoiler, unlike the conventional art. Accordingly, the manufacturing process is simplified, whereby the productivity is increased. Furthermore, the vehicle spoiler of the present invention has a structure such that various kinds of nozzles can be mounted thereto, thus having high intercompatibility.

What is claimed is:

1. A vehicle spoiler having first and second surfaces forming an external shape of the vehicle spoiler, with a hollow space defined in the vehicle spoiler, the vehicle spoiler comprising:

a support unit provided on the second surface, with a nozzle installation space defined in the support unit;

a holding part formed in a shape surrounding the support unit to fasten the support unit to the second surface;

a through hole formed by cutting part of the holding part and part of the support unit such that the nozzle installation space communicates with the hollow space through the through hole; and a discharge unit installed in the support unit through the through hole and having a nozzle for spraying window washer fluid.

2. The vehicle spoiler as set forth in claim 1, wherein the support unit comprises:

a mounting member having a fastening plate for mounting the nozzle; and a cover member fitted over an upper end of the mounting member, thus forming the nozzle installation space therein.

3. The vehicle spoiler as set forth in claim 2, wherein a stop protrusion is provided on a sidewall of the mounting member so that the cover member is stopped by and fastened to the stop protrusion.

4. The vehicle spoiler as set forth in claim 1, wherein the support unit is integrated with the second surface in a process of blow-molding the vehicle spoiler.

5. A method of manufacturing a vehicle spoiler using upper and lower molds defining a cavity therebetween, comprising:

placing a support unit on the lower mold;

inserting a parison into the cavity after the support unit is placed;

forming the parison into a shape of the cavity by supplying hot air to the parison;

forming a holding part from part of the parison surrounding the support unit while the parison is formed into the shape of the cavity;

forming a through hole by cutting parts of the support unit and the holding part using a machining tool after the holding part is formed; and installing a nozzle in the support unit through the through hole.

6. The method as set forth in claim 5, wherein a support protrusion for holding the support unit is provided on the lower mold.

* * * * *